United States Patent [19]

Krokos

[11] 4,077,332

[45] Mar. 7, 1978

[54] AUTOMOBILE TIE DOWN ASSEMBLY

[75] Inventor: Raymond M. Krokos, Detroit, Mich.

[73] Assignee: Evans Products Company, Portland, Oreg.

[21] Appl. No.: 657,175

[22] Filed: Feb. 11, 1976

Related U.S. Application Data

[63] Continuation-in-part of Ser. No. 542,616, Jan. 20, 1975, Pat. No. 4,022,134, which is a continuation-in-part of Ser. No. 457,817, Apr. 4, 1974, abandoned.

[51] Int. Cl.² .......................... B25B 25/00; B60P 7/08; B61 D 45/00; B66 D 1/26
[52] U.S. Cl. ............................... 105/477; 105/368 R; 254/161; 254/184
[58] Field of Search ..................... 24/230.5 TD; 105/282 R, 368 R, 368 T, 473, 477, 503, 482; 242/100.1, 107.1, 107.13; 248/119 R, 503; 254/161, 164, 167, 184, 185 R; 280/179 A; 292/60, 266, 278; 296/1 A

[56] References Cited

U.S. PATENT DOCUMENTS

| | | | |
|---|---|---|---|
| 846,316 | 3/1907 | Keyes | 254/184 X |
| 1,159,953 | 11/1915 | Kilborn | 254/164 X |
| 2,322,576 | 6/1943 | Huebshman et al. | 105/473 X |
| 2,386,836 | 10/1945 | Blagden | 105/473 |
| 2,591,986 | 4/1952 | Weiss et al. | 24/230.5 TD |
| 2,874,992 | 2/1959 | Erickson | 296/1 A |
| 3,348,273 | 10/1967 | Hall | 105/368 R X |
| 3,454,260 | 7/1969 | Schwiebert et al. | 254/161 X |
| 3,465,691 | 9/1969 | Simmons | 296/1 A X |
| 3,564,577 | 2/1971 | Blunden et al. | 105/477 |
| 3,601,866 | 8/1971 | Odin | 105/473 X |
| 3,712,249 | 1/1973 | Nagy et al. | 105/282 R |
| 3,820,817 | 6/1974 | Harold | 105/368 T X |
| 3,844,228 | 10/1974 | Blunden et al. | 105/368 T |
| 4,022,134 | 5/1977 | Krokos | 105/477 |

Primary Examiner—Robert J. Spar
Assistant Examiner—Howard Beltran
Attorney, Agent, or Firm—Harness, Dickey & Pierce

[57] ABSTRACT

Devices for tying down motor vehicles during transport on a transporting vehicle, such as a railroad car, truck, or the like. Each tie down device includes a winch and a tie down fitting for effecting a detachable connection to the transported vehicle. With each tie down the winch includes a base member that is adapted to be positioned in a floor mounted track on the transporting vehicle and a shaft onto which a chain or flexible transmitter is adapted to be wound. The shaft of the winch is disposed with its rotational axis parallel to the direction in which the track extends. The tie down fitting has a first portion that is adapted to be connected to a chain or other flexible transmitter of the winch and second and third portions, each of which is configured to effect a detachable connection to a respective attachment means of the transported vehicle. The attachment means of the respective vehicles are different, and for this reason the second and third portions of the tie down fitting are differently configured.

8 Claims, 8 Drawing Figures

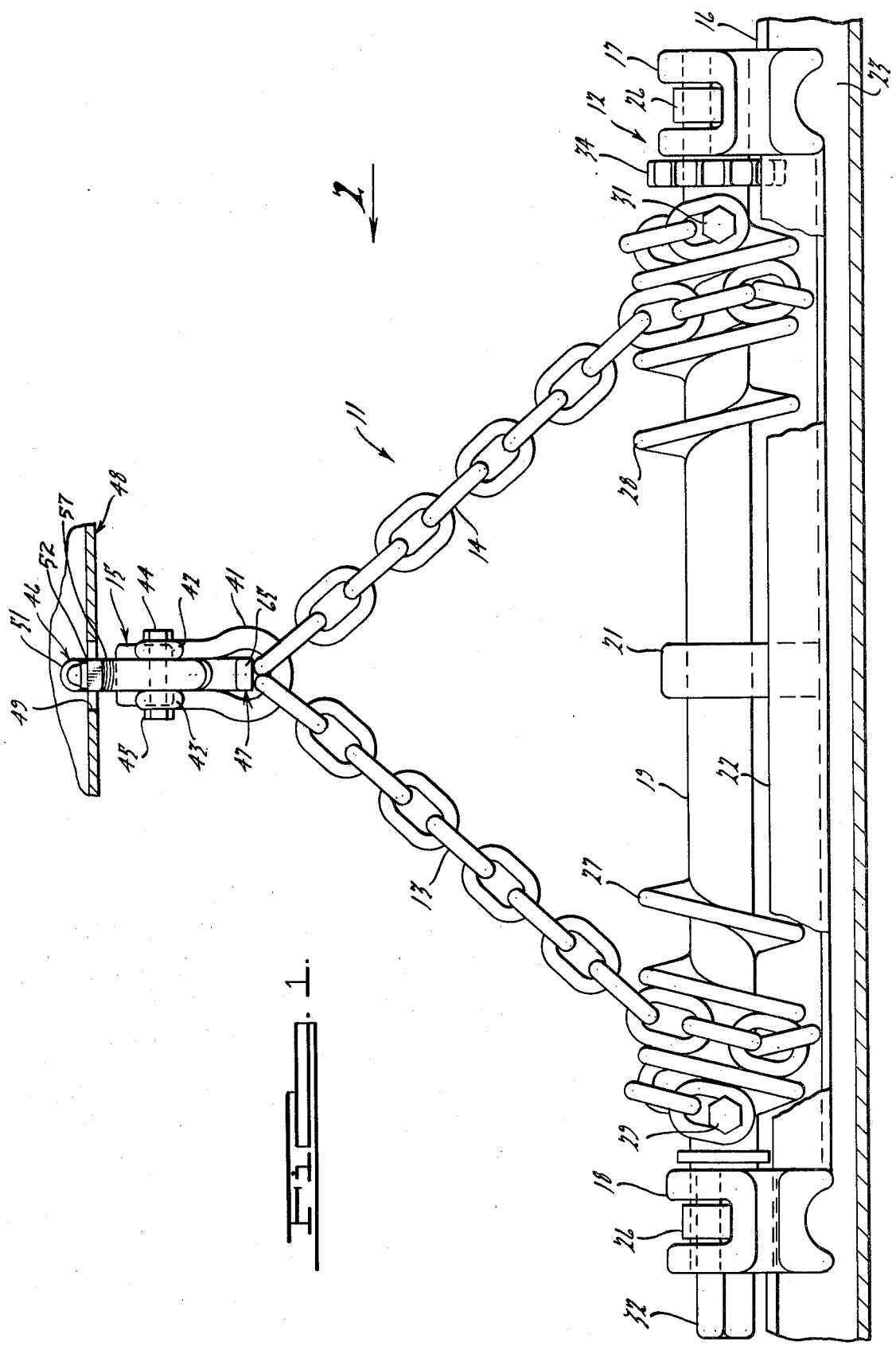

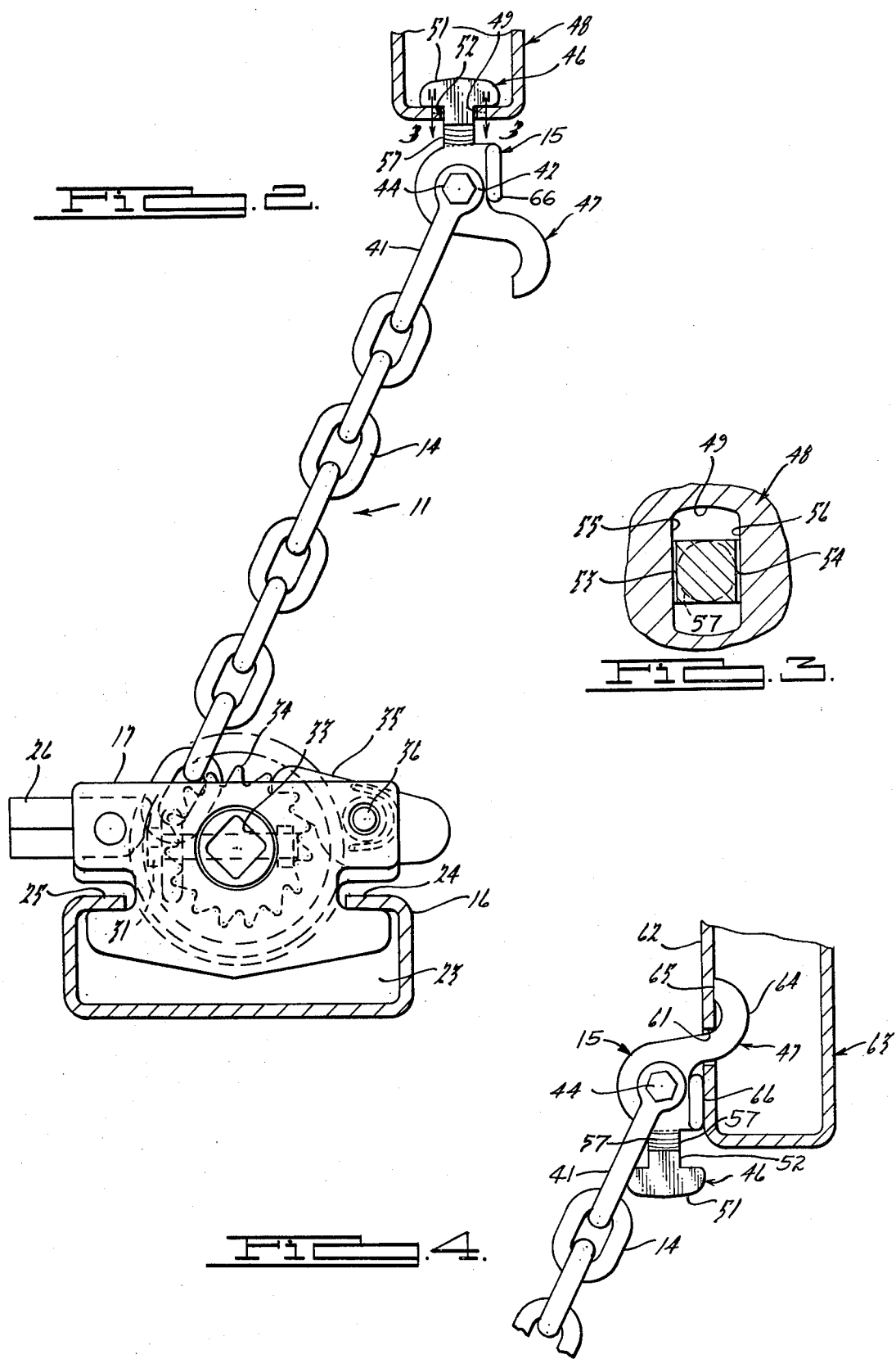

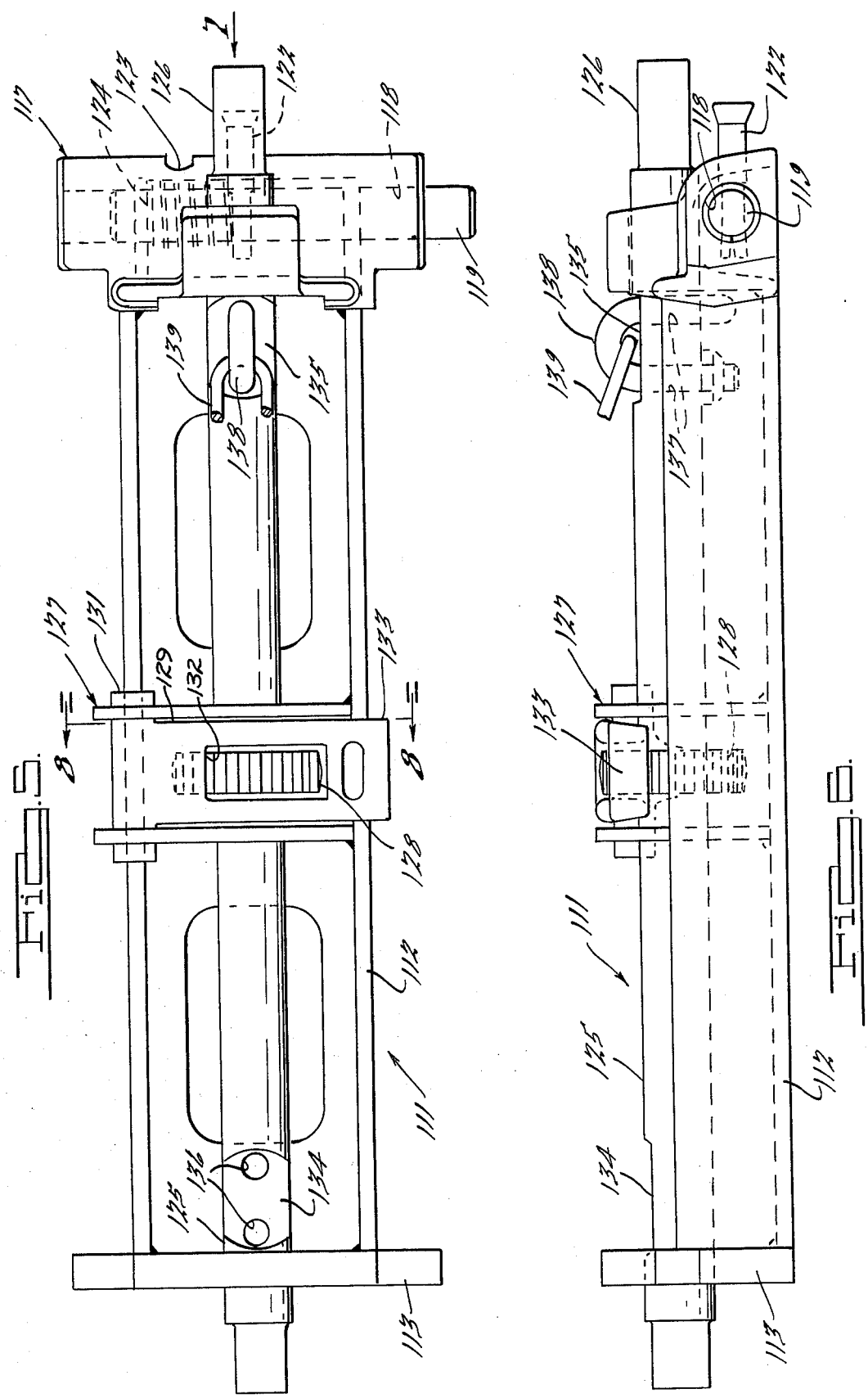

4,077,332

AUTOMOBILE TIE DOWN ASSEMBLY

CROSS REFERENCE TO RELATED APPLICATIONS

This application is a continuation-in-part of my application of the same title, Ser. No. 542,616, filed Jan. 20, 1975 now U.S. Pat. No. 4,022,134, issued May 10, 1977, which application is a continuation-in-part of my application of the same title, Ser. No. 457,817, filed Apr. 4, 1974 and now abandoned.

BACKGROUND OF THE INVENTION

This invention relates to an automotive tie down and to a tie down fitting for effecting a detachable connection to different loads.

When transporting motor vehicles on another vehicle it is common to provide a form of tie down for restraining the transported vehicle against substantial movement. Such tie downs normally include a winch for tying down the vehicle, which winch is adapted to be detachably connected to a track carried by the supporting vehicle. Because of the low profile of modern motor vehicles, it is essential that the winch be low profile in itself so as to permit passage beneath the vehicle. Furthermore, the winch must be constructed in such a way so as to permit the take-up of considerable chain or other flexible transmitter during the tie down operation. Furthermore, it is desirable if the tie down be capable of restraining movement of the vehicle in a plurality of directions.

It is, therefore, a principal object of this invention to provide an improved automotive tie down.

It is another object of this invention to provide a low profile automotive tie down.

It is a further object of this invention to provide an automotive tie down that restrains the vehicle in a plurality of directions.

The necessity for tying down a load during transport has been described. Normally, the tie down includes a fitting for effecting a detachable connection to the load and a flexible transmitter for attaching the fitting and attached load to the transporting vehicle. In many instances, some device is also provided for tensioning the flexible transmitter to insure good tie down of the load. It is not uncommon for a particular tie down to be used in conjunction with the tying down or attachment of varying types of loads or for tying down loads of the same general type but having different attachment means for cooperation with the fitting. It is almost impossible to obtain the cooperation of the shippers in providing the same tie down attachment for all loads.

It is, therefore, another object of this invention to provide an improved tie down fitting that may be used with loads having different types of attachment means.

It is still another object of the invention to provide a tie down fitting for tying down motor vehicles during transport that may be attached to vehicles having different types of attachment openings in their frame or under-structure.

SUMMARY OF THE INVENTION

A first embodiment of this invention is adapted to be incorporated in a tie down for holding vehicles during transport on another vehicle having an extending track mounted thereon. The tie down comprises a base member adapted to be affixed to the track of the transporting vehicle. A shaft is journaled by the base member and extends with its axis parallel to the length of the track. Means are provided for rotating the shaft and for affixing an end of the flexible transmitter to the shaft at one end thereof. The flexible transmitter is adapted to carry a hook at a place spaced from its end for providing a detachable connection to the transported vehicle. The shaft is adapted to receive the flexible transmitter along its length for effectively shortening the length of the flexible transmitter and tying down the transported vehicle as the shaft is rotated.

Another feature of the invention is also adapted to be embodied in a vehicle tie down. The tie down includes a base member that is adapted to be affixed to the transporting vehicle and a shaft journaled by the base member. Means are incorporated for rotating the shaft. Screw-like threads of opposite hands are formed on the shaft at opposite ends thereof and extending toward each other. Respective ends of a flexible transmitter are adapted to be affixed to the shaft at respective ends of the screw-like portions. The flexible transmitter is adapted to carry a hook between its points of attachment to the shaft for providing a detachable connection to the transported vehicle. The screw-like threads are adapted to maintain substantially the same angle between the flexible transmiter as the shaft is rotated and the transported vehicle is tied down.

A tie down fitting constructed in accordance with another embodiment of this invention is adapted to provide a detachable connection to different loads, each having a respective type of attachment means. The tie down fitting has a first portion that is adapted to be affixed to a chain or like flexible transmitter. Second and third portions are configured to coact with the attachment means of first and second loads, respectively. The second and third portions are configured differently from each other so as to accommodate different attachment means of the respective loads.

BRIEF DESCRIPTION OF THE DRAWINGS

FIG. 1 is a side elevational view of an automotive tie down constructed in accordance with a first embodiment of this invention, with portions broken away.

FIG. 2 is an end elevational view of the tie down shown in FIG. 1, taken generally in the direction of the arrow 2 and with portions broken away.

FIG. 3 is an enlarged cross sectional view taken along the line 3—3 of FIG. 2.

FIG. 4 is a partial view, in part similar to FIG. 2, showing the end fitting connected to a different type of motor vehicle attachment.

FIG. 5 is a top plan view of a tie down constructed in accordance with a second embodiment of the invention.

FIG. 6 is a side elevational view of the tie down shown in FIG. 5.

DETAILED DESCRIPTION OF THE PREFERRED EMBODIMENTS

EMBODIMENT OF FIGS. 1 THROUGH 4

Figure 7:
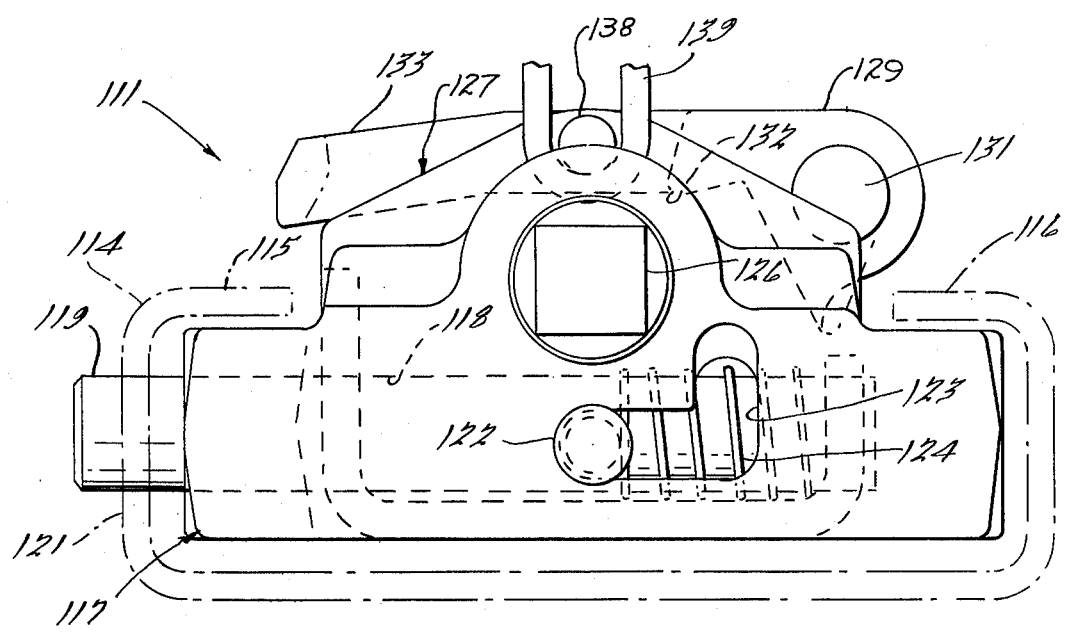
FIG. 7 is an enlarged end view of the tie down taken in the direction of the arrow 7 in FIG. 5 and showing the tie down in cooperation with an associated track.

A tie down embodying this invention is identified generally by the reference numeral 11. The tie down 11 includes a winch, indicated generally by the reference numeral 12, which is adapted to tension a pair of flexible transmitters or chains 13 and 14 which are in turn connected to a tie down fitting 15. The winch 12 is adapted to be connected in any of a plurality of positions to a transporting vehicle (not shown) via tracks 16. The tie down assembly 11 is particularly adapted for use in the transportation of motor vehicles, as will become more apparent as this description proceeds.

The winch 12 is of the same construction as described in my aforementioned application entitled AUTOMOTIVE TIE DOWN, Ser. No. 457,817, filed Apr. 4, 1974, and assigned to the assignee of this invention. The winch 12 is comprised of a pair of spaced bearing members, preferably forgings, 17 and 18 that journal a shaft 19. An intermediate shaft support 21 may also be employed. The forgings 17 and 18 and intermediate shaft support 21 are all affixed to a common channel-shaped member 22. The forgings 17 and 18 have a generally inverted T-shaped configuration in cross section (FIG. 2) and are adapted to be inserted into a longitudinally extending opening 23 of the track 16. A pair of inwardly extending legs 24 and 25 of the track 16 engage the T-shaped portions of the forgings 17 and 18 to hold the winch 12 vertically relative to the associated transporting vehicle. A suitable locking mechanism including a pivoted lever 26 is provided for locking the winch 12 in selected longitudinal positions relative to the transporting vehicle through cooperation with a locking track (not shown).

The shaft 19 is formed with a pair of screw-like portions 27 and 28 which are of opposite hand. At the outer ends of the screw portions 27 and 28 connections 29 and 31 are provided for affixing one end of each of the chains 13 and 14 to the shaft 19.

The shaft 19 may be rotated by inserting either a female-headed tool or a squared portion 32 at one end of the shaft 19 or a male-headed tool into a square-shaped opening 33 formed in the opposite end of the shaft 19. A ratchet wheel 34 is affixed to the shaft 19 for cooperation with a locking pawl 35 which is spring biased into an engaged position to prevent the shaft 19 from rotating in a direction so as to relieve the tension on the chains 13 and 14. The locking pawl 35 is pivotally supported on the forging 17 by means of a pivot pin 36 and is movable between a locked position (as shown in FIG. 2) and a released position in which the shaft 19 is free to rotate in either direction.

The ends of the chains 13 and 14 remote from the winch 12 are connected to the tie down fitting 15 by a U-shaped clevis 41. The clevis 41 has eyelets 42 and 43 that receive a bolt 44 and nut 45 for affording a detachable connection between the clevis 41 and the fitting 15.

The fitting 15 may be formed as a forging, casting, or the like and is configured to effect a detachable connection to motor vehicles having different types of detachment openings. The fitting 15 has first and second respective portions 46 and 47 for this purpose.

The portion 46 is adapted to be used in conjunction with a motor vehicle having a generally slotted opening in a lower or horizontally extending portion of its undercarriage. Such an attachment is shown in FIGS. 1–3 wherein the motor vehicle undercarriage is identified generally by the reference numeral 48. The undercarriage 48 is formed with an elongated opening 49 in its lowermost surface. The fitting portion 46 has a generally T-shaped configuration with a head portion 51 that is adapted to be passed through the opening 49 when the fitting 15 is rotated 90° from the position shown in the figures. At the base of the head portion 51, a square-sided shank portion 52 is provided. The portion 52 has flat sides 53 and 54 (FIG. 3) that extend parallel to complementary sides 55 and 56 of the opening 49. The cooperation between the respective flats 53, 55 and 54, 56 prevent the fitting 15 from rotating when the chains 13 and 14 are tensioned and thus preclude inadvertent detachment of the fitting 15 from the vehicle undercarriage 48. Below the square-sided portion 52, A rounded-sided portion 57 is formed that permits free rotation of the fitting 15 relative to the frame portion 48 so as to permit attachment and desired disconnection.

The fitting portion 47 is used for affording a detachable connection to a vehicle having an undercarriage as shown in FIG. 4. With this type of opening, a generally circular-shaped aperture 61 is formed in a vertically extending leg 62 of the vehicle undercarriage 63. The fitting portion 47 is comprised of a hook-like section 64 that is adapted to be passed into the opening 61 with its flattened end 65 in engagement with the inner surface of the under-frame portion 62. A pad 66 formed adjacent the pivot point afforded by the bolt 44 engages the outer surface of the undercarriage portion 62. It should be noted from an inspection of FIG. 4 that the tension on the chains 13 and 14 will apply a force on the fitting portion 47 that causes the pad 66 and flattened end portion 65 to engage opposite sides of the frame portion 62 thus preventing inadvertent detachment.

From the foregoing description, it should be readily apparent that the fitting 15 affords a detachable connection to either of two different types of automotive attachment openings. Each attachment is designed so as to prevent inadvertent detachment when the fitting is under load but which will readily be detachable when the fitting is not tensioned.

EMBODIMENT OF FIGS. 5 THROUGH 8

Figure 8:
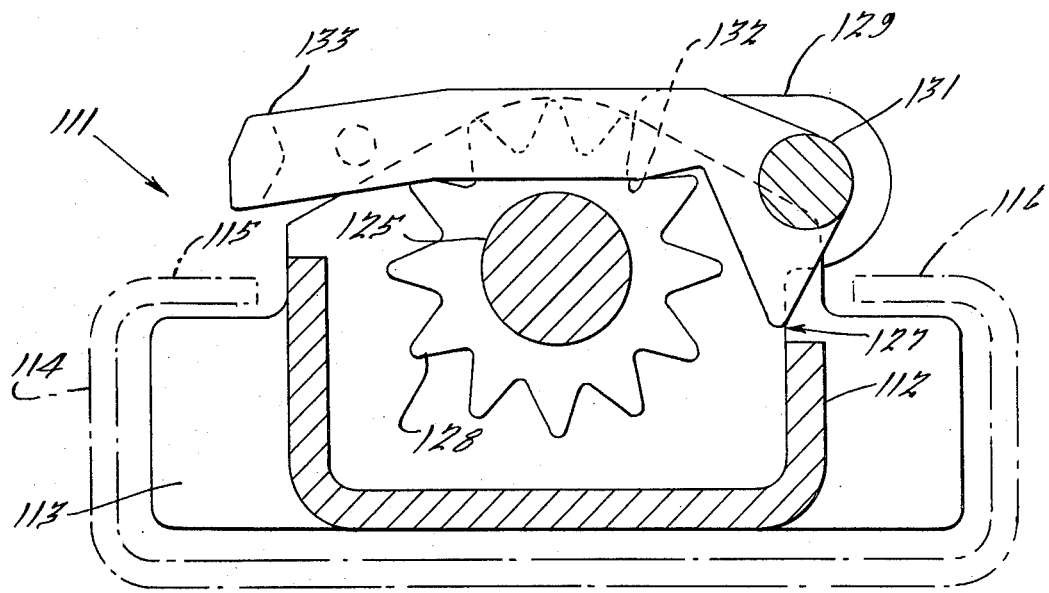
FIG. 8 is an enlarged cross sectional view similar to FIG. 7 and taken along the line 8—8 in FIG. 5.

In the preceding embodiment the tie down embodied a pair of flexible transmitters each of which was connected to a common winch. The previously described tie down has the advantage of restraining the transported vehicle in a pluarlity of directions. In some instances, however, it is desirable to provide a low profile tie down incorporating only one flexible transmitter. The embodiment of FIGS. 5 through 8 shows such a construction.

The tie down of this embodiment is identified generally by the reference numeral 111. As with the preceding embodiment, the tie down 111 includes a generally channel-shaped base member 112. Affixed to one end of the base member 112 is an inverted T-shaped end piece 113. The end piece 113 is adapted to be received in a floor mounted track 114, (FIGS. 7 and 8) of the construction described in the preceding embodiment. The track 114 has a pair of inwardly extending flanges 115 and 116 that lie over the cross leg of the end member 113 to retain the winch assembly of the tie down 111 in the track 114.

At the opposite end of the base member 112, a forging or casting 117 is provided. The member 117 also has a generally T-shape (FIG. 7) and is received under the track legs 115 and 116 to complete the retention of the winch portion of the tie down 111 to the track 114.

The forging 117 has a transversely extending bore 118 in which a slidably supported lock pin 119 is positioned. The lock pin 119 is adapted to be received in selected apertures of a side leg 121 of the track 114 to lock the end fitting 111 in selected longitudinal positions along the track. A release pin 122 is staked to the lock pin 119 and extends through a generally L-shaped slot 123 of the forging 117. A coil compression spring 124 normally urges the lock pin 119 to its engaged position. To release the lock pin 119, the pin 122 is slid along the horizontal leg of the slot 123 and rotated vertically upwardly through the vertical portion of the slot. This compresses the spring 124 and releases the lock pin 119.

A shaft 125 extends with its rotational axis parallel to the length of the track 114 and is journaled by the end plate 113 and forging 117. The end of the shaft 125 that extends through the forging 117 is squared, as at 126 so as to accommodate a suitable tool for rotating the shaft 125.

Affixed to the channel-shaped base member 112 between its ends is an intermediate bearing support, indicated generally by the reference numeral 127. The bearing support 127 provides an intermediate journal for the shaft 125. In addition, the intermediate support 127 carries a locking pawl, to be described, of a ratchet assembly for holding the shaft 125 against rotation. In the area of the intermediate support 127 a ratchet wheel 128 is affixed to the shaft 125. A locking pawl 129 is pivotally supported on the intermediate support 127 by means of a pivot pin 131. The locking pawl 129 has a portion 132 that is adapted to be received between the teeth of the ratchet wheel 128 to hold the ratchet wheel 128 and shaft 125 against rotation. Integrally formed with the pawl 129 is an extending release level 133. The release lever 133 extends across the winch portion of the tie down 111 and provides an end that is engageable by an operator so as to release the engagement of the pawl tooth 132 from the ratchet wheel 128 so that the shaft 125 may be rotated.

The shaft 125 is formed with flattened portions 134 and 135 at its opposite ends and adjacent to the plate 113 and forging 117, respectively. Pairs of holes 136 and 137 extend through the flattened portions 134 and 135 respectively. A U bolt 138 is adapted to extend through either of the pair of holes 136 and 137 to attach a chain or flexible transmitter 139 to the desired end of the shaft 125. The opposite end of the chain (not shown) is adapted to carry a fitting of the type described in the preceding embodiment for effecting a detachable connection to the transported vehicle. When the connection is so made, the shaft 125 is rotated and the chain 139 will be wound around the respective end of the shaft to tie down the vehicle, as is believed to be readily apparent.

It is to be understood that the foregoing description is that of preferred embodiments of the invention. Various changes and modifications may be made without departing from the spirit and scope of the invention, as defined by the appended claims.

I claim:

1. A tie down for holding vehicles during transport on another vehicle having an extending track mounted thereon, comprising a base member adapted to be affixed to the track of the transporting vehicle, a shaft journaled by said base member and extending with its axis parallel to the length of the track, means for rotating said shaft, and means for affixing an end of a flexible transmitter to said shaft at one end of said shaft, the flexible transmitter being adapted to carry a hook at a place spaced from its end for providing a detachable connection to the transported vehicle at a point along the length of the track spaced from said one end of said shaft, said flexible transmitter being adapted to wrap around said shaft along its length from said one end of said shaft toward its other end for effectively shortening the length of said flexible transmitter and tying down the transported vehicle as said shaft is rotated.

2. A tie down as set forth in claim 1 further including releasable locking means for selctively affixing said tie down to the track of the associated transporting vehicle.

3. A tie down as set forth in claim 1 wherein the base member carries spaced bearing means rotatably supporting the shaft, ratchet means juxtaposed to one of said bearing means for cooperating with said shaft for locking said shaft against rotation in one direction.

4. A tie down as set forth in claim 3 further including screw-like threads formed on said shaft and extending from adjacent one of the bearing means toward the center of said shaft and adapted to receive the flexible transmitter therebetween, and an intermediate bearing affixed to said base member and journalling the central portion of said shaft.

5. A tie down for holding vehicles during transport on another vehicle comprising a base memer adapted to be affixed to the transporting vehicle, a shaft journaled by said base member, means for rotating said shaft, screw-like threads of opposite hands formed on said shaft at opposite ends thereof and extending toward each other, means for affixing a respective end of a flexible transmitter to said shaft at the respective ends of said screw-like portions, the flexible transmitter being adapted to carry a hook between its points of attachment to said shaft for providing a detachable connection to the transported vehiicle, said flexible transmitter being adapted to wrap around said shaft along said screw-like threads upon rotation of said shaft, said screw-like threads being adapted to maintain substantially the same angle between said flexible transmitter as said shaft is rotated and the transported vehicle is tied down.

6. A tie down as set forth in claim 5 wherein the base member further includes releasable locking means for selectively affixing said tie down to the associated transporting vehicle.

7. A tie down set forth in claim 6 further including a ratchet means cooperable with the shaft for locking the shaft against rotation in one direction.

8. A tie down as set forth in claim 7 further including intermediate bearing means carried by the base member and journalling the shaft between the screw-like threads.

* * * * *